US012087227B2

(12) United States Patent
Kuang et al.

(10) Patent No.: US 12,087,227 B2
(45) Date of Patent: Sep. 10, 2024

(54) DISPLAY PANEL, METHOD FOR DRIVING A DISPLAY PANEL AND DISPLAY APPARATUS

(71) Applicants: WUHAN TIANMA MICRO-ELECTRONICS CO., LTD., Wuhan (CN); Wuhan Tianma Microelectronics Co., Ltd. Shanghai Branch, Shanghai (CN)

(72) Inventors: Jian Kuang, Wuhan (CN); Mengmeng Zhang, Wuhan (CN); Xingyao Zhou, Wuhan (CN); Yana Gao, Wuhan (CN)

(73) Assignees: WUHAN TIANMA MICROELECTRONICS CO., LTD., Wuhan (CN); Wuhan Tianma Microelectronics Co., Ltd. Shanghai Branch

( * ) Notice: Subject to any disclaimer, the term of this patent is extended or adjusted under 35 U.S.C. 154(b) by 0 days.

(21) Appl. No.: 18/464,053

(22) Filed: Sep. 8, 2023

(65) Prior Publication Data

US 2023/0419904 A1 Dec. 28, 2023

(30) Foreign Application Priority Data

Jun. 12, 2023 (CN) ......................... 202310695462.9

(51) Int. Cl.
*G09G 3/3233* (2016.01)

(52) U.S. Cl.
CPC ... *G09G 3/3233* (2013.01); *G09G 2300/0842* (2013.01); *G09G 2310/0202* (2013.01);
(Continued)

(58) Field of Classification Search
CPC ......... G09G 3/3233; G09G 2300/0842; G09G 2310/0202; G09G 2310/0262;
(Continued)

(56) References Cited

U.S. PATENT DOCUMENTS

2008/0068312 A1* 3/2008 Kim .................... G09G 3/2014 345/84
2019/0340977 A1* 11/2019 Park .................... G09G 3/3275
(Continued)

FOREIGN PATENT DOCUMENTS

CN 110444160 A 11/2019

*Primary Examiner* — Jonathan A Boyd
(74) *Attorney, Agent, or Firm* — CHRISTENSEN O'CONNOR JOHNSON KINDNESS PLLC

(57) ABSTRACT

Provided are a display panel, a method for driving a display panel, and a display apparatus. The display panel includes a light-emitting element, a pixel driver circuit, and a control circuit. The pixel driver circuit includes a driver transistor and a first light emission control switch. A working mode of the display panel includes a first mode. In the first mode, a working cycle of the pixel driver circuit includes a data writing phase and at least one data holding phase subsequent to the data writing phase. The data writing phase includes at least one first light-emitting period. The data holding phase includes at least one second light-emitting period. The control circuit controls a duration of a first one of the at least one first light-emitting period in the data writing phase to be less than a duration of one of the at least one second light-emitting period.

17 Claims, 14 Drawing Sheets

(52) U.S. Cl.
CPC . *G09G 2310/0262* (2013.01); *G09G 2310/08* (2013.01); *G09G 2320/0233* (2013.01); *G09G 2320/0247* (2013.01); *G09G 2320/0626* (2013.01); *G09G 2330/021* (2013.01)

(58) Field of Classification Search
CPC ....... G09G 2310/08; G09G 2320/0233; G09G 2320/0247; G09G 2320/0626; G09G 2330/021; G09G 2300/0819; G09G 2300/0861; G09G 2310/0251; G09G 2310/061; G09G 3/32; G09G 3/3208; G09G 3/3291
See application file for complete search history.

(56) References Cited

U.S. PATENT DOCUMENTS

2022/0036814 A1* 2/2022 Hwang ................ G09G 3/3233
2022/0122522 A1* 4/2022 Li ........................ G09G 3/3233

* cited by examiner

DISPLAY PANEL, METHOD FOR DRIVING A DISPLAY PANEL AND DISPLAY APPARATUS

CROSS-REFERENCE TO RELATED APPLICATION

The present application claims priority to Chinese Patent Application No. 202310695462.9, filed on Jun. 12, 2023, the content of which is incorporated herein by reference in its entirety.

TECHNICAL FIELD

The present disclosure relates to the technical field of display, and in particular to a display panel, a method for driving a display panel, and a display apparatus.

BACKGROUND

With the development of display technology, a display panel can display information at different refresh frequencies in different modes. For example, the display panel displays, using a high refresh frequency, dynamic frames (such as sports events or games) so as to ensure the smoothness of the display images, and displays, using a lower refresh frequency, static frames so as to reduce its power consumption.

However, at present, when the display panel is driven at a low refresh frequency, flicker may occur on the display panel.

SUMMARY

Embodiments of the present disclosure provide a display panel, a method for driving a display panel, and a display apparatus, having less flicker in a low-frequency display mode.

In an aspect, a display panel is provided. The display panel includes a light-emitting element and a pixel driver circuit electrically connected to the light-emitting element. The pixel driver circuit includes a driver transistor and a first light emission control switch. The driver transistor includes a gate electrically connected to a first node, a first electrode electrically connected to a second node, and a second electrode electrically connected to a third node. The first light emission control switch is electrically connected between the third node and the light-emitting element.

A working mode of the display panel includes a first mode. In the first mode, a working cycle of the pixel driver circuit includes a data writing phase and at least one data holding phase after the data writing phase. The data writing phase includes at least one first light-emitting period. The data holding phase includes at least one second light-emitting period. In the first light-emitting period and the second light-emitting period, the first light emission control switch is turned on.

The display panel further includes a control circuit. The control circuit controls a duration of a first one of the at least one first light-emitting period in the data writing phase to be less than a duration of one of the at least one second light-emitting period.

In another aspect, a method for driving a display panel is provided. The display panel includes a light-emitting element and a pixel driver circuit electrically connected to the light-emitting element. The pixel driver circuit includes a driver transistor and a first light emission control switch. The driver transistor includes a gate electrically connected to a first node, a first electrode electrically connected to a second node, and a second electrode electrically connected to a third node. The first light emission control switch is electrically connected between the third node and the light-emitting element. A working mode of the display panel includes a first mode. In the first mode, a working cycle of the pixel driver circuit includes a data writing phase and at least one data holding phase after the data writing phase. The data writing phase includes at least one first light-emitting period. The data holding phase includes at least one second light-emitting period. In the first light-emitting period and the second light-emitting period, the first light emission control switch is turned on.

The driving method includes controlling a duration of a first one of the at least one first light-emitting period in the data writing phase to be less than a duration of one of the at least one second light-emitting period.

In yet another aspect, provided is a display apparatus including the above display panel.

Static frames are displayed by the display panel in the first mode, the data refresh frequency of the display panel is reduced, and the power consumption of the display panel when displaying static frames or when in an always on display (AOD) mode is reduced.

In the first mode, the duration of the first one of the at least one first light-emitting period in the data writing phase is less than the duration of one of at least one second light-emitting period. This can reduce the brightness of the light-emitting element in the data writing phase, thereby compensating for the brightness reduction of the light-emitting element in the data holding phase, caused by the change in the potential of the first node due to the leakage current. In this way, the brightness consistency of the light-emitting element in the data writing phase and data holding phase is improved, thereby alleviating the flicker problem.

BRIEF DESCRIPTION OF DRAWINGS

To describe the technical solutions in the embodiments of the present disclosure more clearly, the following briefly describes the accompanying drawings used in the embodiments. The accompanying drawings in the following description show merely some embodiments of the present disclosure, and a person of ordinary skill in the art may derive other accompanying drawings from these accompanying drawings.

DESCRIPTION OF EMBODIMENTS

For the sake of a better understanding of the technical solutions of the present disclosure, the embodiments of the present disclosure are described in detail below with reference to the accompanying drawings.

It should be noted that the embodiments in the following descriptions are merely some rather than all of the embodiments of the present disclosure. All other embodiments obtained by a person of ordinary skill in the art on the basis of the embodiments of the present disclosure shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

It should be understood that the term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

It should be understood that although the terms first, second, third, and the like may be used to describe nodes in the embodiments of the present disclosure, these nodes should not be limited to these terms. These terms are merely used to distinguish the nodes from one other. For example, without departing from the scope of the embodiments of the present disclosure, a first node can also be referred to as a second node. Similarly, a second node can also be referred to as a first node.

Figure 1:
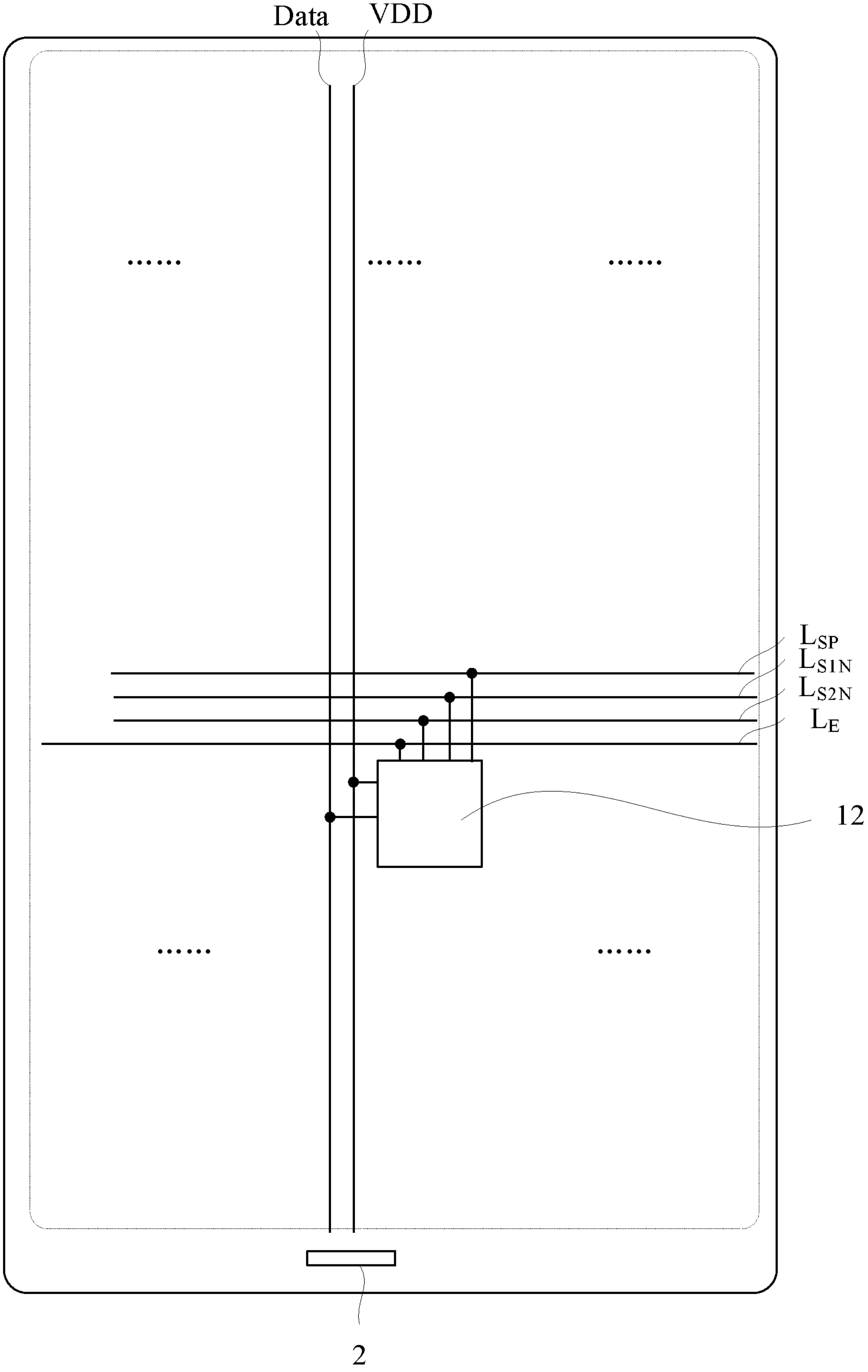
FIG. 1 is a structural diagram of a display panel according to one or more embodiments of the present disclosure.
Figure 2:
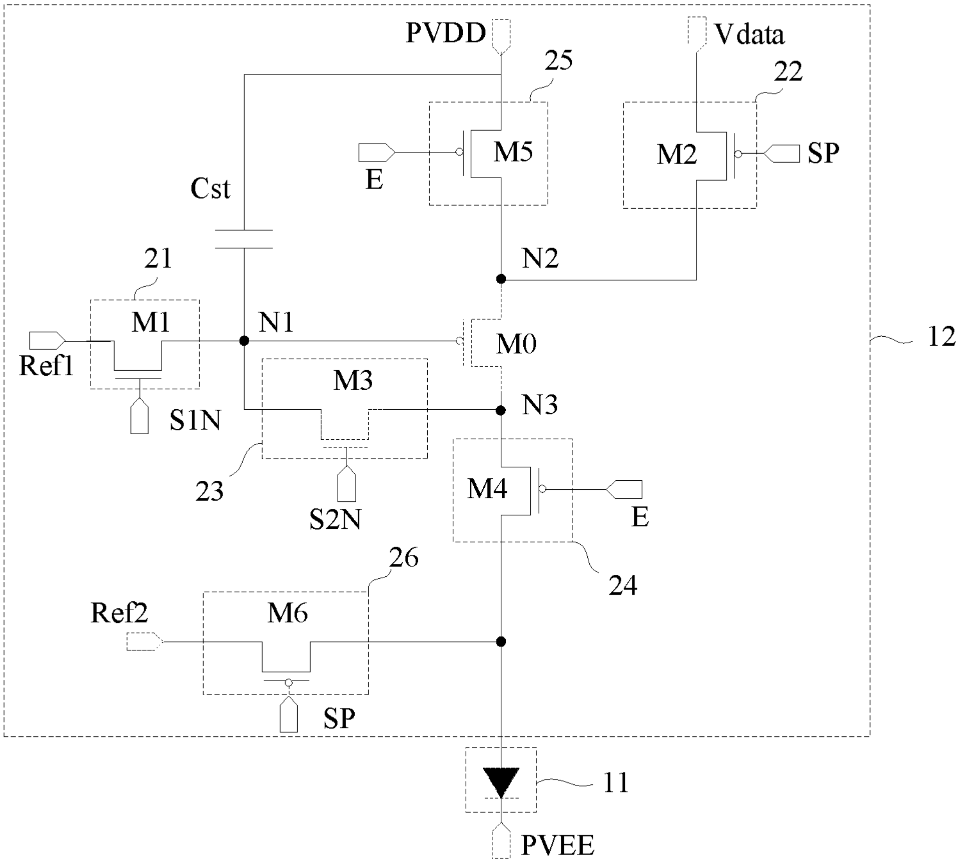
FIG. 2 is a circuit diagram of a sub-pixel according to one or more embodiments of the present disclosure.

Embodiments of the present disclosure provide a display panel. FIG. 1 is a structural diagram of the display panel according to embodiments of the present disclosure. As shown in FIG. 1, the display panel includes a plurality of sub-pixels. Referring to FIG. 2, FIG. 2 is a circuit diagram of the sub-pixel according to embodiments of the present disclosure. The sub-pixel includes a light-emitting element 11 and a pixel driver circuit 12 electrically connected with the light-emitting element 11. The light-emitting element 11 includes, but is not limited to, an organic light-emitting diode (OLED), a Mini LED, a Micro LED, or a quantum dot light-emitting diode (QLED).

The pixel driver circuit 12 includes a driver transistor M0, a storage capacitor Cst, a first reset switch 21, a data writing switch 22, a threshold compensation switch 23, a first light emission control switch 24, and a second light emission control switch 25. The driver transistor M0 includes a gate electrically connected to a first node N1, a first electrode electrically connected to a second node N2, and a second electrode electrically connected to a third node N3. It should be noted that in the embodiment of the present disclosure, the first node N1, the second node N2, and the third node N3 are only defined for the convenience of describing the structure of the pixel driver circuit 12. Therefore, the first node N1, the second node N2, and the third node N3 are not necessarily actual circuit units. In some embodiments, each of the first reset switch, the data writing switch, the threshold compensation switch, the first light emission control switch, and the second light emission control switch includes one or more transistors.

As shown in FIG. 2, the first reset switch 21 electrically connects a first reset signal terminal Ref1 and the first node N1. The data writing switch 22 electrically connects a data signal terminal Vdata and the second node N2. The threshold compensation switch 23 electrically connects the third node N3 and the first node N1. The second light emission control switch 25 electrically connects a first power voltage signal terminal PVDD and the second node N2. The first light emission control switch 24 electrically connects the third node N3 and the first electrode of the light-emitting element 11. The second electrode of the light-emitting element 11 is electrically connected to a second power voltage signal terminal PVEE. The storage capacitor Cst is electrically connected to the first node N1.

A working mode of the display panel includes a first mode and a second mode. A data refresh frequency in the first mode is lower than a data refresh frequency in the second mode. Exemplarily, the data refresh frequency in the first mode may be less than 60 Hz. For example, the data refresh frequency in the first mode is 10 Hz, 15 Hz or 30 Hz. The data refresh frequency in the second mode may be greater than or equal to 60 Hz. For example, the data refresh frequency in the second mode is 60 Hz, 75 Hz or 120 Hz.

Figure 3:
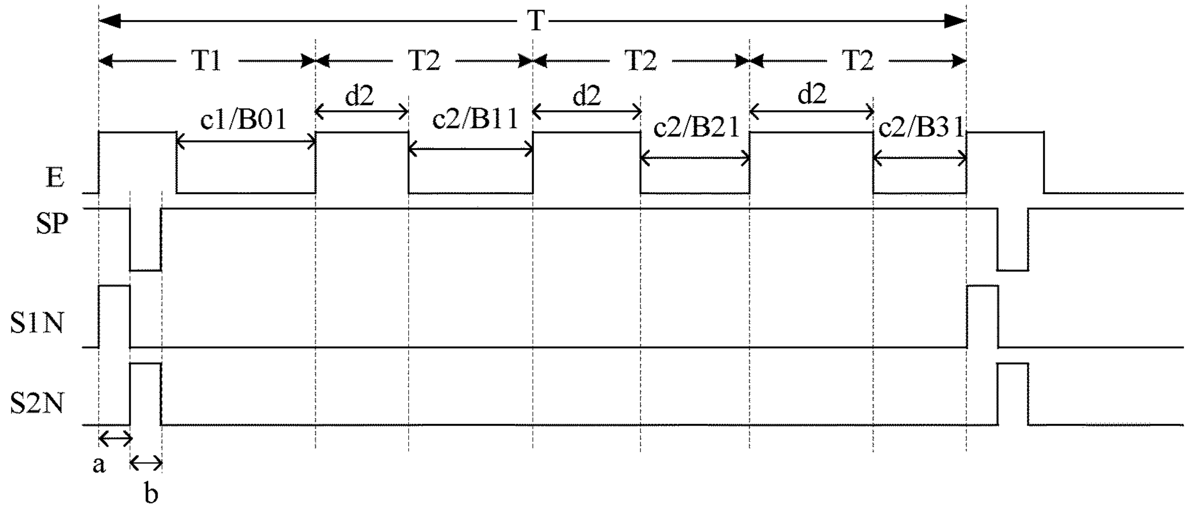
FIG. 3 is a timing diagram of a display panel in a first mode according to one or more embodiments of the present disclosure.

The sub-pixels are arranged in multiple rows. During an image frame, the pixel driver circuits 12 in the sub-pixels are enabled/scanned row by row to input data voltages corresponding to the current frame to the sub-pixels. FIG. 3 is a timing diagram of the display panel in the first mode according to embodiments of the present disclosure. In the first mode, as shown in FIG. 3, a working cycle T of the pixel driver circuit 12 includes a data writing phase T1 and n data holding phases T2 after the data writing phase T1, n being an integer greater than or equal to 1. In FIG. 3, for example, n=3. That is, the working cycle T of the pixel driver circuit 12 includes three data holding phases T2.

As shown in FIG. 3, the data writing phase T1 includes a first reset period a, a data writing period b, and m first light-emitting periods c1. The first reset period a is before the data writing period b, and the m first light-emitting periods c1 are all after the data writing period b. The data holding phase T2 includes m second light-emitting periods c2, m being an integer greater than or equal to 1. In FIG. 3, taking m=1 as an example, the data writing phase T1 includes one first light-emitting period c1, and the data holding phase T22 includes one second light-emitting period c2.

Figure 4:
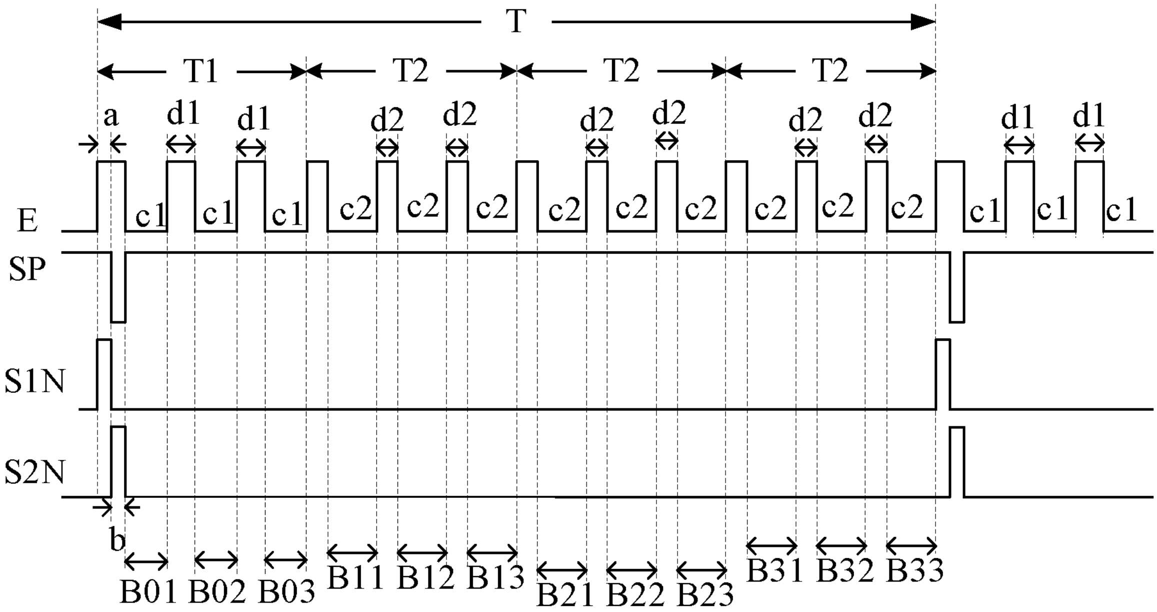
FIG. 4 is a timing diagram of another display panel in the first mode according to one or more embodiments of the present disclosure.

Exemplarily, referring to FIG. 4, FIG. 4 is a timing diagram of another display panel in the first mode according to an embodiment of the present disclosure. Taking m=3 as an example, the data writing phase T1 includes three first light-emitting periods c1, and the data holding phase T22 includes three second light-emitting periods c2.

When the display panel is working in the first mode, as shown in FIGS. 2, 3 and 4, in the first reset period a, the first reset switch 21 is turned on by a signal provided by a first scan control signal terminal SiN. A first reset signal provided by the first reset signal terminal Ref1 is inputted to the first node N1 through the first reset switch 21 so as to reset the first node N1. The purpose is to eliminate an impact of a signal input to the first node N1 in a previous frame (that is, during a previous working cycle T) on a potential of the first node N1 in the current working cycle T.

In the data writing period b, the first reset switch 21 is turned off, the data writing switch 22 is turned on by a signal provided by a second scan control signal terminal SP, and the threshold compensation switch 23 is turned on by a signal provided by a third scan control signal terminal S2N. The data signal terminal Vdata inputs a data voltage corresponding to the current working cycle T to the first node N1 through the data writing switch 22. Meanwhile, the threshold compensation switch 23 detects and compensates for a deviation of a threshold voltage Vth of the driver transistor M0 at this phase. When the potential of the first node N1 reaches Vd−|Vth|, the driver transistor M0 is turned off, completing the capture of the threshold voltage Vth of the driver transistor M0. Vd denotes a data voltage provided by the data signal terminal Vdata corresponding to the current working cycle T.

In the first light-emitting period c1, the first reset switch 21, the data writing switch 22, and the threshold compensation switch 23 are turned off. The potential of the first node N1 is maintained by the storage capacitor Cst. The first light emission control switch 24 is turned on by a signal provided by a light emission control signal terminal E. The second light emission control switch 25 is turned on by the signal provided by the light emission control signal terminal E. The driver transistor M0 is turned on by the first node N1. Under the action of a driving current generated by the driver transistor M0, the light-emitting element 11 emits light.

Exemplarily, as shown in FIG. 4, when the data writing period T1 includes at least two first light-emitting periods c1, the pixel driver circuit 12 further includes a first non-light-emitting period d1 located between each two adjacent first light-emitting periods c1. In the first non-light-emitting period d1, the first light emission control switch 24 is turned off under the control of the light emission control signal terminal E, and the light-emitting element 11 does not emit light. In the embodiment of the present disclosure, a plurality of first light-emitting periods c1 are arranged, and each two adjacent first light-emitting periods c1 are separated by the first non-light-emitting period d1. In this way, the light-emitting element 11 is turned on and off alternately during a drive process, so as to adjust an overall brightness of the light-emitting element 11 in the data writing phase T1. Exemplarily, in the embodiment of the present disclosure, a duration ratio of the first light-emitting period c1 to the first non-light-emitting period d1 is adjustable to adjust the brightness of the light-emitting element 11.

After the data writing phase T1, the pixel driver circuit 12 enters the data holding phase T2. As shown in FIGS. 3 and 4, the data holding phase T2 includes a second non-light-emitting period d2 and a second light-emitting period c2. In the second non-light-emitting period d2, the first light emission control switch 24 is turned off under the control of the light emission control signal terminal E, and the light-emitting element 11 does not emit light. In the second light-emitting period c2, the potential of the first node N1 is maintained by the storage capacitor Cst, and the first light emission control switch 24, the second light emission control switch 22, and the driver transistor M0 are turned on. The third node N3 is electrically connected to the light-emitting element 11. The driver transistor M0 generates a driving current under the control of the potential of the first node N1. The light-emitting element 11 emits light under the control of the driving current.

In the embodiment of the present disclosure, a duration of the first one of the first light-emitting periods c1 in the data writing phase T1 is denoted as Bi1, and a duration of a j-th one of the second light-emitting periods c2 in the i-th data holding phase T2 is denoted as Bij. Both i and j are integers, $1 \le i \le n$, and $1 \le j \le m$.

As shown in FIG. 1, the display panel further includes a control circuit 2. As shown in FIGS. 3 and 4, in the embodiments of the present disclosure, the control circuit 2 is configured to cause the duration Bi1 of the first one of the first light-emitting periods c1 in the data writing phase T1 to be less than the duration Bij of each of at least one second light-emitting period c2 in the data holding phase T2. The first one of the first light-emitting periods c1 in the data writing phase T1 may be referred to as the first-one first light-emitting period c1 or initial first light-emitting period c1. When the data writing phase T1 includes at least two first light-emitting periods c1, the first one of the at least two first light-emitting periods c1 is a light-emitting period that is closest to the data writing period b in one working cycle T of the corresponding pixel driver circuit 12. When the data writing phase T1 includes one first light-emitting period c1, the first light-emitting period c1 is the first-one first light-emitting period c1.

Optionally, as shown in FIGS. 3 and 4, in the embodiment of the present disclosure, the duration of the data writing phase T1 and the duration of a single data holding phase T2 can be the same.

In the embodiment of the present disclosure, the working mode of the display panel includes the first mode, such that static frames can be driven in the first mode, thereby reducing the data refresh frequency of the display panel, and reducing the power consumption of the display panel in the display of static frames or in an always on display (AOD) mode.

As shown in FIG. 2, in the first mode, the potential of the first node N1 in the pixel driver circuit 12 is not refreshed in the data holding phase T2. That is, the potential of the first node N1 needs to be maintained for a long time under the action of the storage capacitor Cst. Conventionally, the potential of the first node N1 changes over time due to a leakage current, leading to a decrease in the brightness of the light-emitting element 11. In embodiments of the present disclosure, the duration B01 of the first-one first light-emitting period c1 in the data writing phase T1 is less than the duration Bij of each of at least one second light-emitting period c2 in the data holding phase T2. This can reduce the brightness of the light-emitting element 11 in the data writing phase T1, thereby compensating for the brightness reduction of the light-emitting element 11 in the data holding phase T2, caused by the change in the potential of the first node N1 due to the leakage current. In this way, the brightness consistency of the light-emitting element 11 in the data writing phase T1 and data holding phase T2 is improved, thereby alleviating or at least reducing the flicker problem.

As shown in FIG. 1, the display panel further includes a data line Data, a first power voltage line VDD, a first scan control signal line $L_{S1N}$, a second scan control signal line $L_{SP}$, a third scan control signal line $L_{S2N}$, and a light emission control signal line $L_E$. The data line Data is electrically connected to a data signal terminal (not shown in FIG. 1) of the pixel driver circuit 12. The first power voltage line VDD is electrically connected to a first power voltage signal terminal (not shown in FIG. 1) of the pixel driver circuit 12. The first scan control signal line $L_{S1N}$ is electrically connected to a first scan control signal terminal (not shown in FIG. 1) of the pixel driver circuit 12. The second scan control signal line $L_{SP}$ is electrically connected to a second scan control signal terminal (not shown in FIG. 1) of the pixel driver circuit 12. The third scan control signal line $L_{S2N}$ is electrically connected to a third scan control signal terminal (not shown in FIG. 1) of the pixel driver circuit 12. The light emission control signal line $L_E$ is electrically connected to a light emission control signal terminal (not shown in FIG. 1) of the pixel driver circuit 12.

Figure 5:
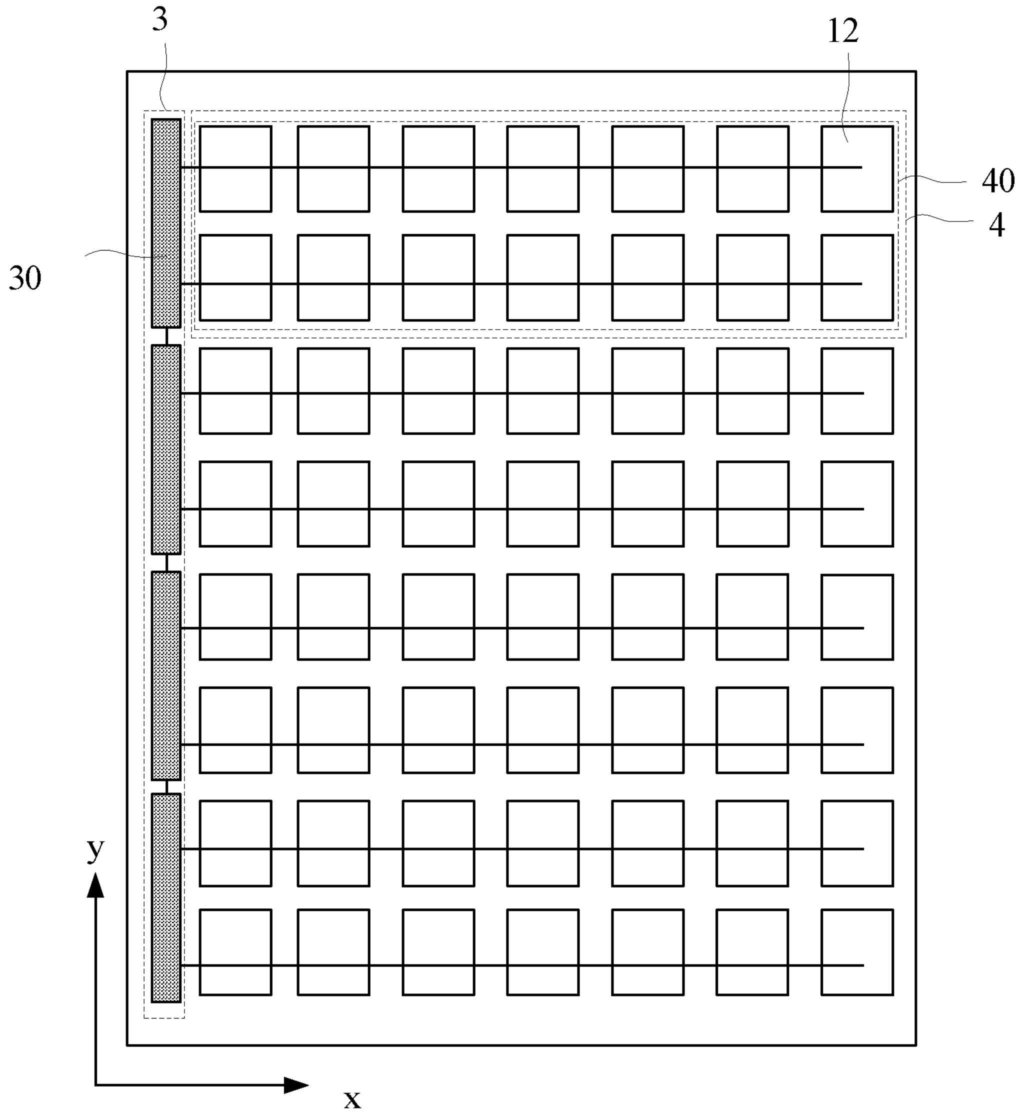
FIG. 5 is a schematic diagram of another display panel according to one or more embodiments of the present disclosure.

Exemplarily, referring to FIG. 5, FIG. 5 is a schematic diagram of another display panel according to an embodiment of the present disclosure. The display panel further includes a light emission control circuit 3. The light emission control circuit 3 includes cascaded light emission control sub-circuits 30. The light emission control sub-circuit 30 is electrically connected to a control terminal of the first light emission control switch (not shown in FIG. 5). Under the action of a light emission control signal outputted by the light emission control sub-circuit 30, the first light emission control switch 24 switches between on state and off state, such that the pixel driver circuit 12 switches between the non-light-emitting period and the light-emitting period. In the first light-emitting period c1 and the second light-emitting period c2, the light emission control signal is at an active level (such as a low level). In the non-light-emitting period, the light emission control signal is at an inactive level (such as a high level). In the example embodiment shown in FIGS. 3 and 4, the active level of the light emission control signal is the low level, and the inactive level is the high level. Of course, the active level of the light emission control signal may be the high level and the inactive level of the light emission control signal may be the low level according to different design requirements for the pixel driver circuit 12. The embodiment of the present disclosure is not limited herein.

In the embodiment of the present disclosure, the control circuit (not shown in FIG. 5) is electrically connected to the light emission control circuit 3. The control circuit 2 can control a duty ratio (also referred to as duty cycle) of a first high-level pulse of the light emission control signal outputted by the light emission control circuit 3 in the data writing phase T1 to be greater than a duty ratio of at least one high-level pulse in the data holding phase T2. In this way, the duration B01 of the first-one first light-emitting period c1 in the data writing phase T1 is less than the duration Bij of each of at least one second light-emitting period c2 in the data holding phase T2.

Exemplarily, the following method is used to make the duration B01 of the first-one first light-emitting period c1 in the data writing phase T1 less than the duration of each of at least one second light-emitting period c2 in the data holding phase T2.

A reference light emission control signal refers to a light emission control signal with the duty cycle of each high-level pulse in the data writing phase T1 the same as the duty cycle of each high-level pulse in the data holding phase T2. For example, compared to the reference light emission control signal, in the embodiment of the present disclosure, a rising edge of a first high-level pulse of the light emission control signal in the data writing phase T1 is moved forward, and/or, a falling edge of the first high-level pulse of the light emission control signal in the data writing phase T1 is moved backward.

Alternatively, in the embodiment of the present disclosure, the rising edge of at least one high-level pulse of the light emission control signal in the data holding phase T2 is moved backward compared to the reference light emission control signal, and/or, the falling edge of at least one high-level pulse of the light emission control signal in the data holding phase T2 is moved forward compared to the reference light emission control signal.

Exemplarily, as shown in FIGS. 3 and 4, in the embodiment of the present disclosure, there are m second light-emitting periods c2 in the data holding phase T2 and m first light-emitting periods c1 in the data writing phase T1. On the one hand, the design can improve the consistency of a bias state of the driver transistor M0 in the data holding phase T2 and in the data writing phase T1, thereby alleviating the flicker problem. On the other hand, the design is conducive to the design of the working timing of the light emission control circuit 3.

Optionally, as shown in FIG. 2, in the embodiment of the present disclosure, the pixel driver circuit 12 is provided with a second reset switch 26 electrically connected to a second reset signal terminal Ref2 and the light-emitting element 11, and a second reset period for resetting the light-emitting element 11 is provided before the first light-emitting period c1 of the data writing phase T2. In the second reset period, the second reset switch 26 is turned on. A second reset signal provided by the second reset signal terminal Ref2 resets the light-emitting element 11.

Optionally, the first reset period a or the data writing period b may be reused as the second reset period. For example, in FIG. 2, the second reset switch 26 is electrically connected to the second scan control signal terminal SP, and in FIGS. 3 and 4, the data writing period b is reused as the second reset period.

Exemplarily, as shown in FIG. 2, in the embodiment of the present disclosure, the first reset switch 21 includes a first transistor M1, the data writing switch 22 includes a second transistor M2, the threshold compensation switch 23 includes a third transistor M3, the first light emission control switch 24 includes a fourth transistor M4, the second light emission control switch 25 includes a fifth transistor M5, and the second reset switch 26 includes a sixth transistor M6.

Optionally, in the embodiment of the present disclosure, at least one of the first transistor M1 and the third transistor M3 includes an oxide transistor to reduce an off-state leakage current of the first transistor M1 or the third transistor M3, thereby reducing the impact of the leakage current on the potential of the first node N1 and improving the potential stability of the first node N1. The design improves the stability of the driving current flowing through the light-emitting element 11 during different light-emitting periods within a working cycle T, so as to further improve the uniformity of the brightness of the light-emitting element 11 and alleviate the flicker problem.

Exemplarily, as shown in FIG. 5, the pixel driver circuits 12 are arranged in rows and columns, and the display panel includes a plurality of pixel driver circuit row groups 4. The pixel driver circuit row group 4 includes N pixel driver circuit rows 40. The pixel driver circuit row 40 includes a plurality of pixel driver circuits 12 arranged in a first direction x. A plurality of pixel driver circuit rows 40 are arranged in a second direction y. A plurality of first light emission control switches (not shown in FIG. 5) in a same pixel driver circuit row group 4 are electrically connected to a same light emission control sub-circuit 30. N is an integer greater than or equal to 1. In this regard, the light emission control sub-circuit 30 adopts a one-drive-N method. In the embodiment of the present disclosure, $B01=Bij-kNH$. In the equation, i is any integer from 1 to n, j is any integer from 1 to m, k is an integer greater than or equal to 1, and H is a row scan time of the pixel driver circuit row 40. In this way, the difficulty of timing design for the light emission control signal outputted by the light emission control sub-circuit 30 is reduced, making it simple and easy to operate.

Exemplarily, in one or more embodiments of the present disclosure, m=2 and $k\times N=4$. In another embodiment of the present disclosure, k=1 and N=4. Alternatively, k=2 and N=2.

In the embodiment of the present disclosure, $N\geq 2$. Thus, each light emission control sub-circuit 30 can drive more pixel driver circuit rows 40, thereby reducing the number of light emission control sub-circuits 30. The design can narrow a bezel of the display panel and increase a screen-to-body ratio of the display panel. Compared with the conventional method in which each light emission control sub-circuit drives one pixel driver circuit row, the above arrangement can reduce the frequency of a light emission clock signal for controlling the light emission control sub-circuit 30, thereby reducing the power consumption of the light emission control unit 30.

Figure 6:
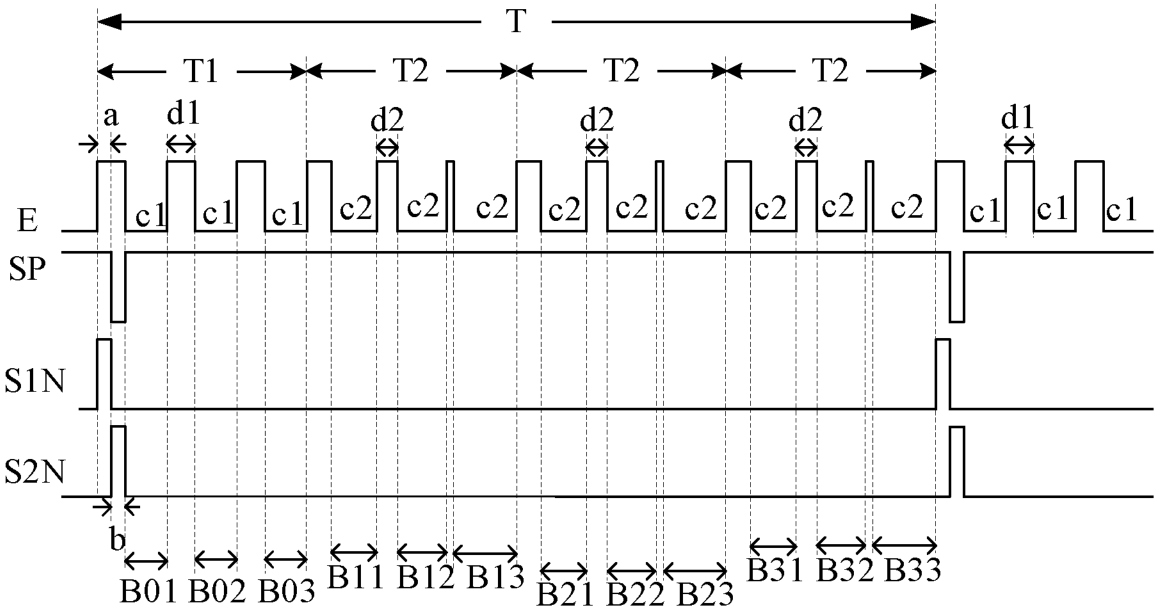
FIG. 6 is a timing diagram of yet another display panel in the first mode according to one or more embodiments of the present disclosure.

Exemplarily, if the data holding phase T2 includes at least two second light-emitting periods c2, the durations of the at least two second light-emitting periods c2 in the same data holding phase T2 may be arranged as following. In some embodiments of the present disclosure, $Bi1\leq Bi2\leq \ldots \leq Bim$, i being any integer from 1 to n. That is, duty cycles of a plurality of high-level pulses of the light emission control signal in the same data holding phase T2 sequentially decrease. As shown in FIG. 2, in the first mode, the potential of the first node N1 in the pixel driver circuit 12 is not refreshed in the data holding phase T2. That is, the potential of the first node N1 needs to be maintained for a long time under the action of the storage capacitor Cst. Conventionally, the potential of the first node N1 decreases over time due to a leakage current, leading to a continuous decrease in the brightness of the light-emitting element 11. In the embodiment of the present disclosure, $Bi1\leq Bi2\leq \ldots \leq Bim$. That is, the durations of the second light-emitting periods c2 in the same data holding phase T2 sequentially increase to compensate for the impact of the leakage current on the brightness of the light-emitting element 11, so as to further alleviate the flicker problem in the first mode. Referring to FIG. 6, FIG. 6 is a timing diagram of yet another display panel in the first mode according to embodiments of the present disclosure. In the example embodiment shown in FIG. 6, m=3, n=3, $B11\leq B12\leq B13$, $B21\leq B22\leq B23$, and $B31\leq B32\leq B33$. That is, the durations of the second light-emitting periods c2 in each data holding phase T2 satisfy the above relationship. The design can compensate for the change of the brightness caused by the leakage current in each data holding phase T2, thereby greatly improving the brightness consistency of the light-emitting element 11 within a working cycle T, alleviating or the avoiding the flicker problem.

Exemplarily, when a working cycle T of the pixel driver circuit 12 includes a plurality of data holding phases T2, in the embodiment of the present disclosure, $B1j\leq B2j\leq \ldots \leq Bnj$, j being any integer from 1 to m. The duty cycles of the corresponding high-level pulses of the light emission control signal transmitted by the light emission control signal terminal E in different data holding phases T2 sequentially decrease to compensate for the impact of the leakage current on the brightness, so as to further alleviate the flicker problem in the first mode.

Exemplarily, when the data holding phase T2 includes at least two second light-emitting periods c2, that is, when $m\geq 2$, in the embodiment of the present disclosure, the second light-emitting periods c2 in the data holding phase T2 and the corresponding second light-emitting periods c2 in other data holding phase T2 meet the above relationship. In the example embodiment shown in FIG. 6, B11=B21=B31, B12=B22=B32, and B13=B23=B33.

Figure 7:
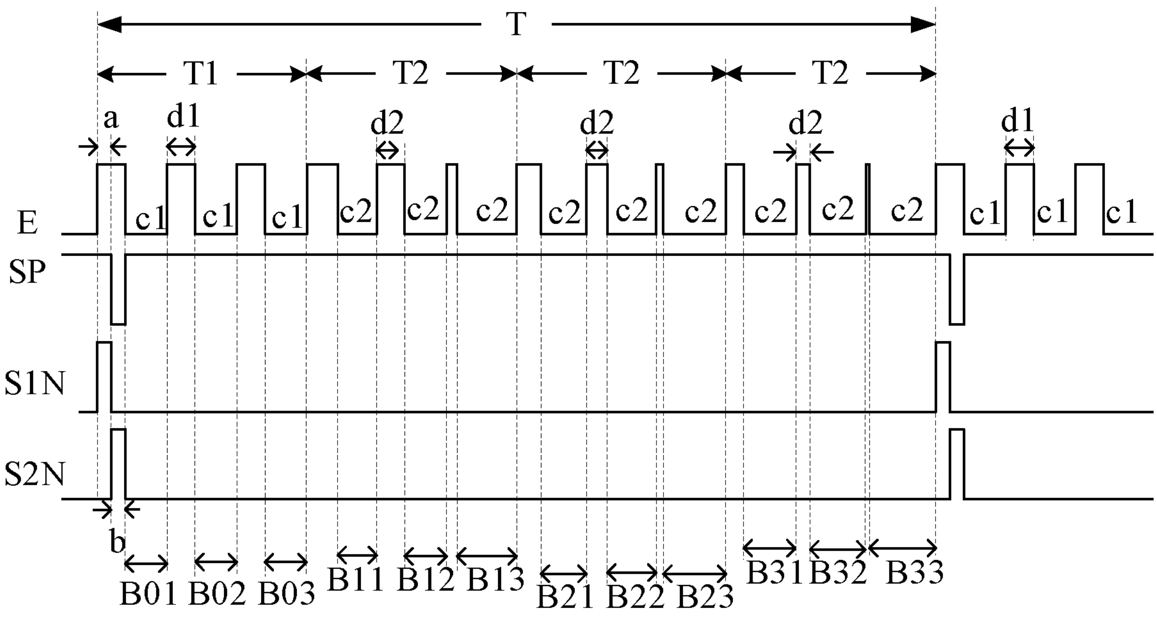
FIG. 7 is a timing diagram of yet another display panel in the first mode according to an embodiment of the present disclosure.

Referring to FIG. 7, FIG. 7 is a timing diagram of yet another display panel in the first mode according to embodiments of the present disclosure. In FIG. 7, for example, m=3, n=3, $B11<B21<B31$, $B12<B22<B32$, $B13<B23<B33$, $B11<B12<B13$, $B21<B22<B23$, and $B31<1332<1333$.

Figure 8:
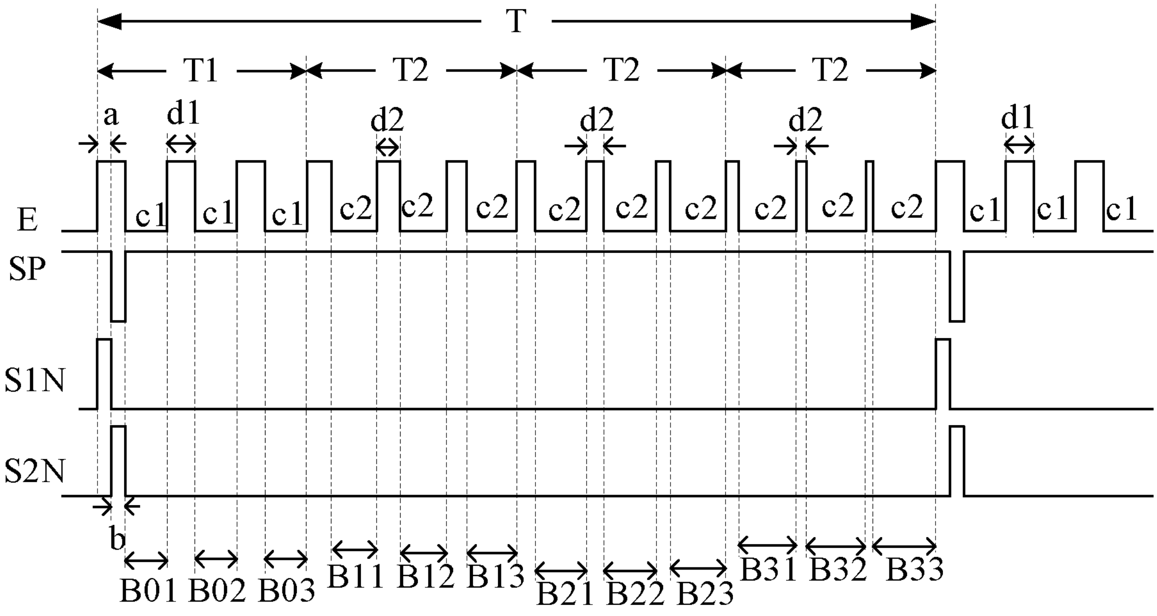
FIG. 8 is a timing diagram of yet another display panel in the first mode according to one or more embodiments of the present disclosure.

Optionally, when $n\geq 2$, the n data holding phases T2 at least include an (i−1)-th data holding phase T2 and an i-th data holding phase T2 that are adjacent. The duration of an m-th second light-emitting period c2 in the (i−1)-th data holding phase T2 is less than or equal to the duration of a first-one second light-emitting period c1 in the i-th data holding phase T2. In some embodiments of the present disclosure, $B(i-1)m<Bi1$. $B(i-1)m$ denotes the duration of the m-th second light-emitting period c2 in the (i−1)-th data holding phase T2, and Bi1 denotes the duration of the first-one second light-emitting period c2 in the i-th data holding phase T2. Referring to FIG. 8, FIG. 8 is a timing diagram of yet another display panel in the first mode according to an embodiment of the present disclosure. In the example embodiment shown in FIG. 8, m=3, n=3, and $B11<B12<B13<B21<B22<B23<B31<B32<B33$. The design can further alleviate the flicker problem in the first mode.

Exemplarily, as shown in FIGS. 3, 4, 5, 6, 7, and 8, when the working cycle of the pixel driver circuit 12 includes a plurality of data holding phases T2 and each data holding phase T2 includes a plurality of second light-emitting periods c2, in some embodiments of the present disclosure, the duration of any second light-emitting periods c2 in any data holding phase T2 is greater than the duration B01 of the first-one first light-emitting period c1 in the data writing phase T1.

Figure 9:
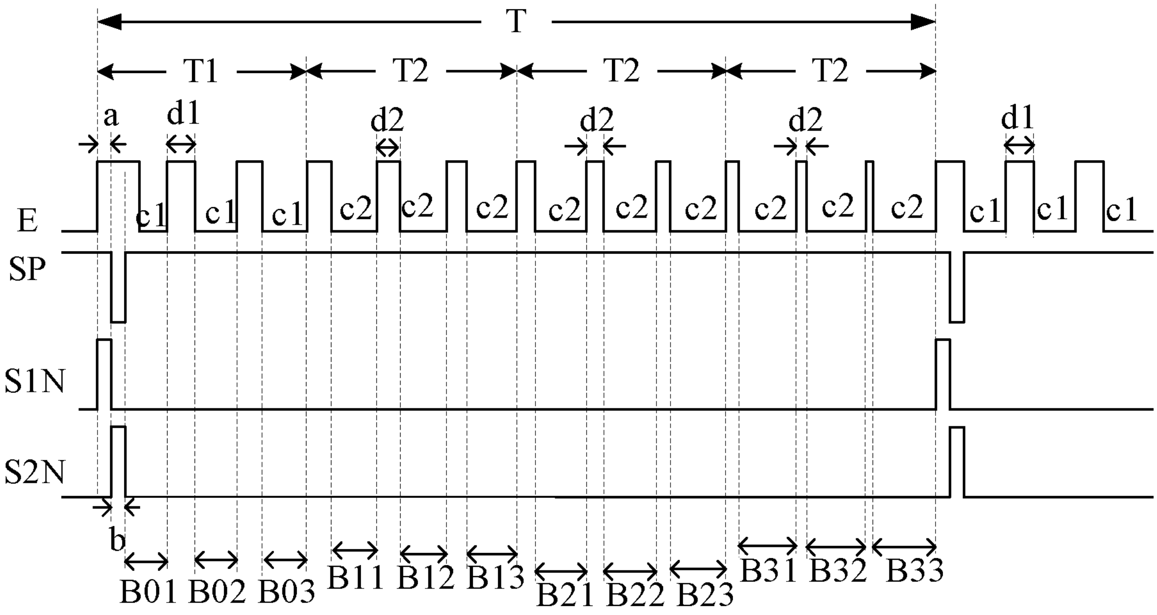
FIG. 9 is a timing diagram of yet another display panel in the first mode according to one or more embodiments of the present disclosure.

Exemplarily, among the m first light-emitting periods c1 of the data writing phase T1, m being an integer greater than or equal to 2, there at least exist two adjacent first light-emitting periods c1. The duration of a previous first light-emitting period c1 of the two adjacent first light-emitting periods c1 is less than the duration of a subsequent first light-emitting period c1 of the two adjacent first light-emitting periods c1. Since the duration of the previous first light-emitting period c1 is less than the duration of the subsequent first light-emitting period c1, the change in the potential of the first node N1 due to the leakage current during the data writing phase T1 is compensated for, thereby alleviating the flicker problem during the data writing phase T1. Referring to FIG. 9, FIG. 9 is a timing diagram of yet another display panel in the first mode according to an embodiment of the present disclosure, m=3. The duration of the first-one first light-emitting period c1 is denoted as B01, the duration of the second-one first light-emitting period c1 is denoted as B02, the duration of the third-one first light-emitting period c1 is denoted as B03, and $B01<B02<B03$.

Figure 10:
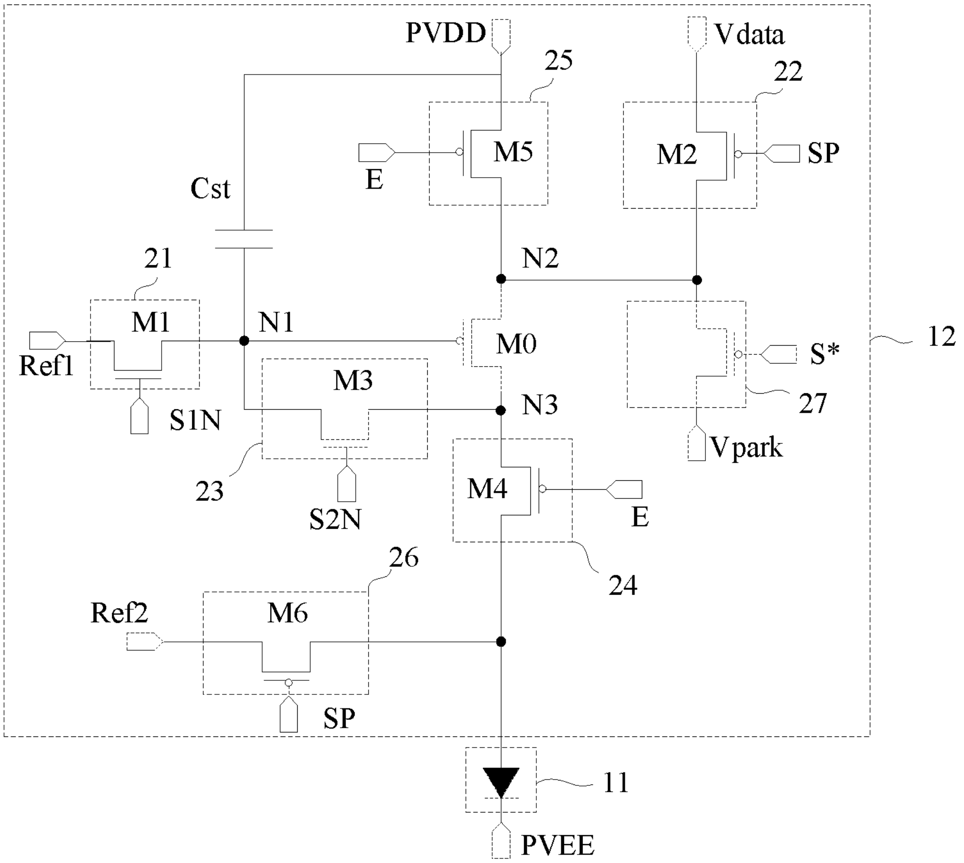
FIG. 10 is a circuit diagram of another sub-pixel according to one or more embodiments of the present disclosure.
Figure 11:
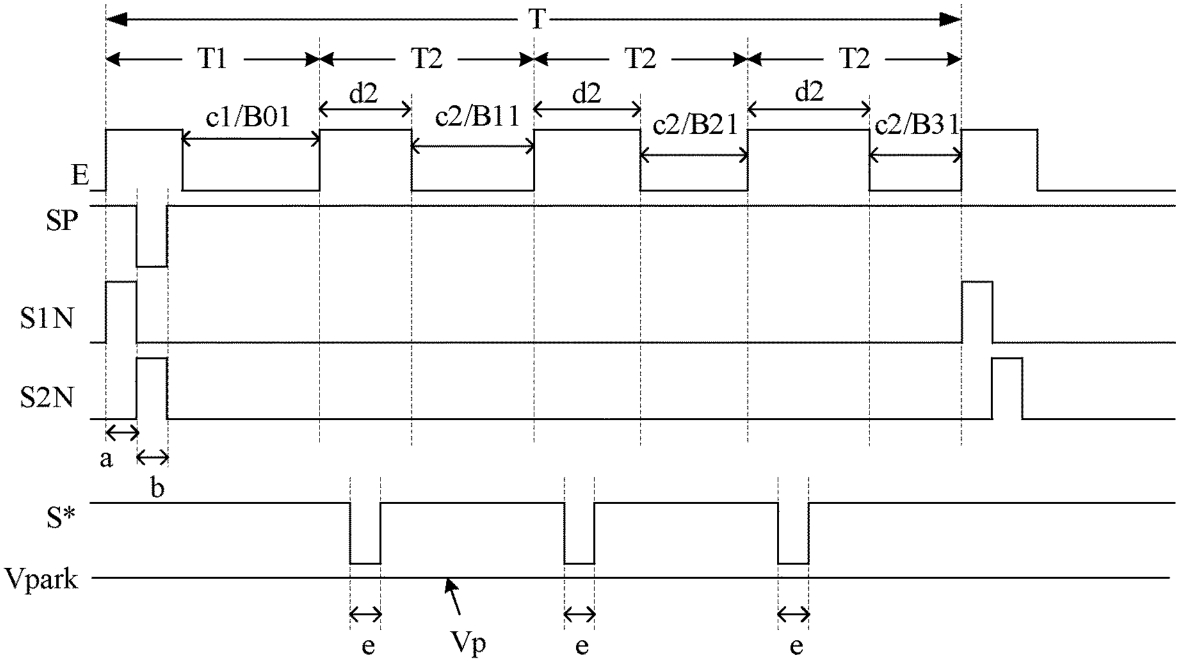
FIG. 11 is a timing diagram corresponding to FIG. 10.

Exemplarily, as shown in FIGS. 10 and 11, FIG. 10 is a circuit diagram of another sub-pixel according to an embodiment of the present disclosure, and FIG. 11 is a timing diagram corresponding to FIG. 10. The pixel driver circuit 12 further includes an adjustment switch 27 electrically connected to the second node N2. The adjustment switch 27 electrically connects an adjustment signal terminal Vpark and the second node N2. A control terminal of the adjustment switch 27 is electrically connected to a fourth scan control signal terminal S*. The data holding phase T12 further includes an adjustment period e before the second light-emitting period c2. During the adjustment period e, the adjustment switch 27 is turned on. A bias adjustment signal Vp provided by the adjustment signal terminal Vpark is inputted to the second node N2 through the adjustment switch 27. The bias adjustment signal can adjust the bias state of the driver transistor M0. The Examiner found that in the data writing phase T1 at an initial stage of each working cycle T, the light-emitting element 11 has a light emission delay in due to a hysteresis voltage of the driver transistor M0, resulting in a brightness delay in the first-one first light-emitting period c1. In some embodiments of the present disclosure, the adjustment switch 27 adjusts the bias of the driver transistor M0 to generate a brightness delay when the display enters the second light-emitting period c2. The design can reduce the brightness of the light-emitting element 11 in the data holding phase T2, thereby reducing a brightness difference between the data holding phase T1 and the data writing phase T2, so as to alleviate the flicker problem in the first mode.

Exemplarily, as shown in FIG. 11, the adjustment period e is located in the second non-light-emitting period d2.

Specifically, when the display panel displays a low gray-scale image, the light emission delay effect in the data writing phase T1 with respect to the data holding phase T2 is more significant. If the duration of the first-one first light-emitting period c1 in the data writing phase T1 is the same as the duration of the second light-emitting period c2 in the data holding phase T2, the brightness in the data writing phase T1 is less than the brightness of the data holding phase T2. In some embodiments of the present disclosure, the duration of the first-one first light-emitting period c1 is shortened, and the bias of the driver transistor M0 is adjusted in the data holding phase T2, so as to reduce the brightness of the light-emitting element 11 in the data holding phase T2. The design ensures that the brightness of the light-emitting element 11 in the data writing phase T1 is close to the brightness thereof in the data holding phase T2, thereby alleviating the flicker problem of the display panel in the first mode.

When the display panel displays a high gray-scale image, a bias voltage of the driver transistor M0 in the data writing phase T1 is relatively weak. The light emission delay effect in the data writing phase T1 with respect to the data holding phase T2 is weaker. If the duration of the first-one first light-emitting period c1 in the data writing phase T1 is the same as the duration of the second light-emitting period c2 in the data holding phase T2, the brightness in the data writing phase T1 is greater than the brightness in the data holding phase T2. In embodiments of the present disclosure, based on the above method, the brightness of the light-emitting element 11 in the data writing phase T1 and the data holding phase T2 is reduced, and thus the brightness difference of the light-emitting element 11 in the data writing phase T1 and the data holding phase T2 perceived by human eyes is reduced, avoiding the deterioration of the flicker problem.

Referring to Table 1, Table 1 provides simulation data for flicker values (in dB) of display panels with different timing designs at different gray-scales. A larger absolute value of a flicker value indicates a weaker flicker level. The highest gray-scale 255 corresponds to a brightness of 300 nit. The data refresh frequencies in Comparative Example 1, Comparative Example 2, and Embodiment are all 10 Hz. In Comparative Example 1, the data holding phase T2 does not include the bias adjustment period e, and the duration of the first one of the first light-emitting periods c1 is the same as the duration of the second light-emitting period c2. In Comparative Example 2, the data holding phase T2 includes the bias adjustment period e, and the duration of the first one of the first light-emitting periods c1 is the same as the duration of the second light-emitting period c2. In Embodiment, the data holding phase T2 includes the bias adjustment period e, and the duration of the first one of the first light-emitting periods c1 is less than the duration of the second light-emitting period c2. Compared to Comparative Example 1 and Comparative Example 2, the flicker problem in low gray-scale display in Embodiment is significantly alleviated, and the flicker level in high gray-scale display in Embodiment is reduced, without deterioration.

TABLE 1

Simulation data for flicker values of display panels with different timing designs at different gray-scales

| Gray-scales | Comparative Example 1 | Comparative Example 2 | Embodiment |
|---|---|---|---|
| 255 | −48.82 | −43.62 | −45.06 |
| 192 | −45.42 | −42.22 | −44.37 |
| 127 | −42.78 | −41.56 | −44.26 |
| 96 | −36.73 | −42.06 | −45.49 |
| 64 | −33.62 | −43.5 | −47.49 |
| 48 | −30.44 | −50.64 | −49.98 |
| 32 | −27.62 | −40.21 | −46.53 |
| 24 | −25.01 | −32.28 | −42.3 |
| 16 | −22.87 | −28 | −39.64 |

Exemplarily, as shown in FIG. 11, in some embodiments of the present disclosure, the bias adjustment signal Vp provided by the bias adjustment signal terminal Vpark includes a constant signal.

Figure 12:
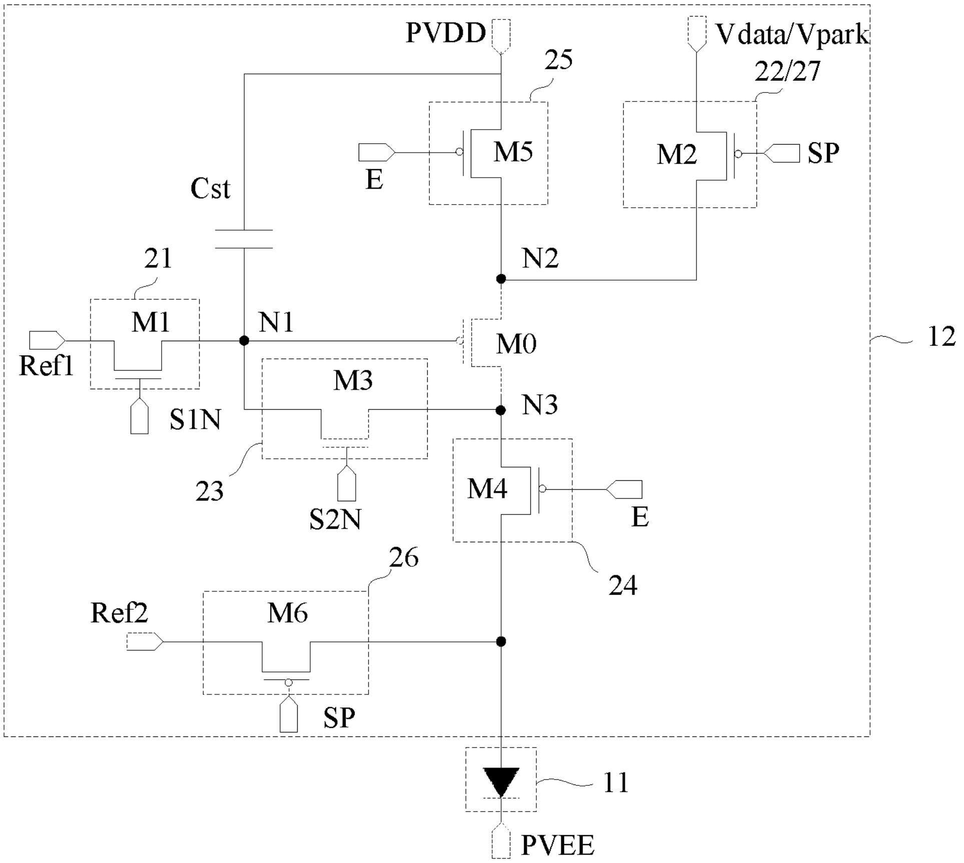
FIG. 12 is a circuit diagram of yet another sub-pixel according to one or more embodiments of the present disclosure.
Figure 13:
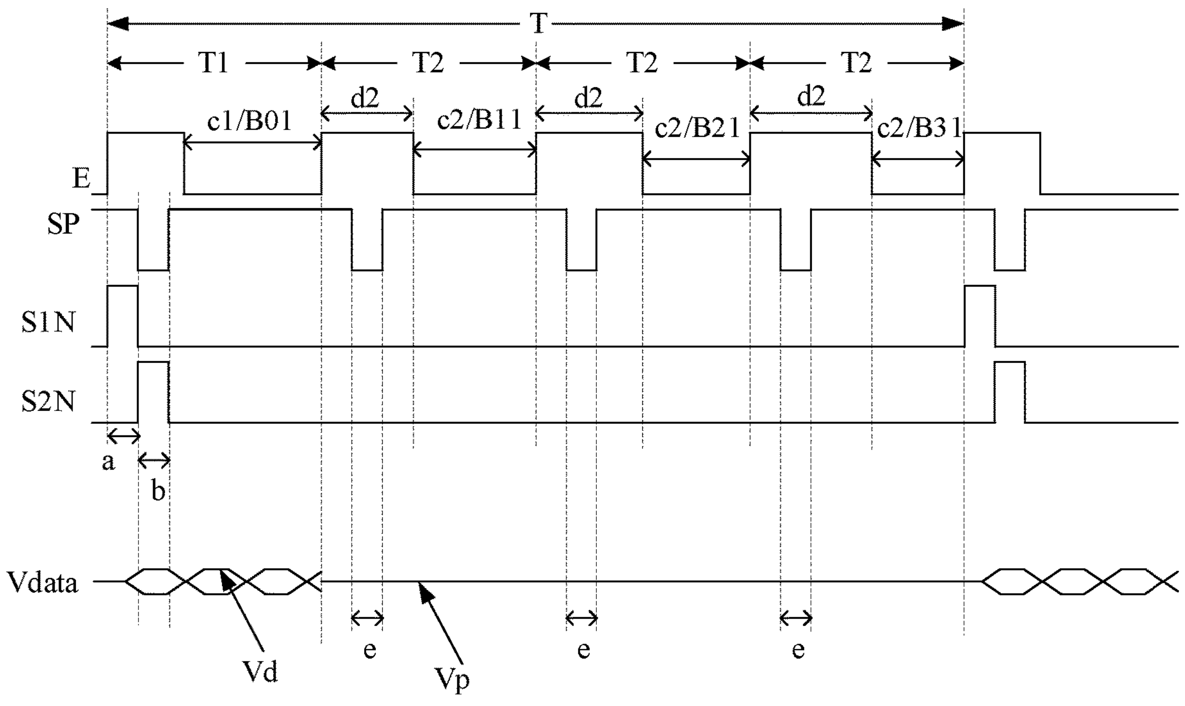
FIG. 13 is a timing diagram corresponding to FIG. 12.

Optionally, referring to FIGS. 12 and 13, FIG. 12 is a circuit diagram of yet another sub-pixel according to an embodiment of the present disclosure, and FIG. 13 is a timing diagram corresponding to FIG. 12. The adjustment switch 27 is further configured to provide a data signal Vd to the second node N2 in the data writing period b. That is, the adjustment switch 27 may also be used as the data writing switch 22, and the bias adjustment signal terminal Vpark may also be used as the data signal terminal Vdata. The design simplifies the structure of the pixel driver circuit 12, and reduces the area occupied by pixel driver circuit 12, thereby improving the resolution of the display panel.

Exemplarily, as shown in FIG. 1, the display panel includes a data line Data. The data line Data is electrically connected to a data signal terminal (not shown in FIG. 1) of the pixel driver circuit 12. The adjustment switch 27 is electrically connected to the data line Data and the second node N2. As shown in FIG. 13, the data line Data is configured to transmit the data signal Vd required by the pixel driver circuit 12 in a current frame during the data writing period b, and to transmit the bias adjustment signal Vp during the adjustment period e. The design can reduce the number of wiring in the display panel and further simplify the structure of the display panel.

Exemplarily, as shown in FIG. 12, the gate of the second transistor M2 is electrically connected to the second scan control signal terminal SP. The second transistor M2 includes a first terminal electrically connected to the data line through the data signal terminal Vdata and a second terminal electrically connected to the second node N2. As shown in FIG. 13, the second scan control signal terminal SP transmits an active level in the data writing period b and the adjustment period e.

Embodiments of the present disclosure further provide a method for driving a display panel. As shown in FIG. 1, the display panel includes a plurality of sub-pixels. The sub-pixel includes a light-emitting element 11 and a pixel driver circuit 12 electrically connected to the light-emitting element 11. The pixel driver circuit 12 includes a driver transistor M0 and a first light emission control switch 24. The driver transistor M0 includes a gate electrically connected to a first node N1, a first electrode electrically connected to a second node N2, and a second electrode electrically connected to a third node N3. The first light emission control switch 24 electrically connects the third node N3 and the light-emitting element 11.

A working mode of the display panel includes a first mode. In the first mode, as shown in FIG. 3, a working cycle T of the pixel driver circuit 12 includes a data writing phase T1 and at least one data holding phase T2 after the data writing phase T1. The data writing phase T2 includes at least one first light-emitting period c1. The data holding phase T2 includes at least one second light-emitting period c2. In the first light-emitting period c1 and the second light-emitting period c2, the first light emission control switch 24 is turned on.

The driving method according to the embodiment of the present disclosure includes the following steps.

A duration of a first one of the at least one first light-emitting period c1 in the data writing phase T1 is less than a duration of each of the at least one second light-emitting period c2 in the data holding phase T2.

In the embodiments of the present disclosure, the working mode of the display panel includes the first mode, and static frames can be driven in the first mode, thereby reducing the data refresh frequency of the display panel, and reducing the power consumption of the display panel when displaying static frames or when in an always on display (AOD) mode. In the embodiments of the present disclosure, the duration Bi1 of the first one of the at least one first light-emitting period c1 in the data writing phase T1 is less than the duration of one of at least one second light-emitting period c2 in the data holding phase T2. This can reduce the brightness of the light-emitting element 11 in the data writing phase T1, thereby compensating for the brightness reduction of the light-emitting element 11 in the data holding phase T2, caused by the change in the potential of the first node N1 due to the leakage current. In this way, the brightness consistency of the light-emitting element 11 in the data writing phase T1 and data holding phase T2 is improved, thereby alleviating the flicker problem.

Exemplarily, in the embodiments of the present disclosure, the duration of the first one of the at least one first light-emitting period c1 in the data writing phase T1 of the pixel driver circuit 12 is denoted as Bi1. A working cycle T of the pixel driver circuit 12 includes n data holding phases T2, and each data holding phase T2 includes m second light-emitting periods c2. A duration of a j-th one of the second light-emitting periods c2 in an i-th data holding phase T2 is denoted as Bij. Both i and j are integers, $1 \le i \le n$, and $1 \le j \le m$.

As shown in FIG. 5, the plurality of sub-pixels are arranged in rows and columns, and the display panel includes a plurality of pixel driver circuit row groups 4 and a plurality of cascaded light emission control sub-circuits 30. The pixel driver circuit row group 4 includes N pixel driver circuit rows 40. The pixel driver circuit row 40 includes a plurality of pixel driver circuits 12 arranged in a first direction x. The first light emission control switches (not shown in FIG. 5) in a same pixel driver circuit row group 4 are electrically connected to a same light emission control sub-circuit 30. N is an integer greater than or equal to 1, that is, the light emission control sub-circuit 30 drives sub-pixels in N pixel driver circuit rows 40.

Exemplarily, in the embodiment of the present disclosure, the duration of the first one of the at least one first light-emitting period c1 in the data writing phase T1 is less than a duration of each of at least one second light-emitting period c2 in the data holding phase T2. That is, $B01 = Bij - kNH$, k being an integer greater than or equal to 1, and H being a row scan time of the pixel driver circuit row 40. In this way, the difficulty of timing design for the light emission control signal outputted by the light emission control sub-circuit 30 is reduced, making it simple and easy to operate.

Optionally, the driving method according to embodiments of the present disclosure further includes: the durations are controlled to meet $Bi1 \le Bi2 \le \ldots \le Bim$, i being any integer from 1 to n. That is, the duty cycles of a plurality of high-level pulses of the light emission control signal in the same data holding phase T2 successively decrease. As shown in FIG. 2, in the first mode, the potential of the first node N1 in the pixel driver circuit 12 is not refreshed in the data holding phase T2. That is, the potential of the first node N1 needs to be maintained for a long time under the action of the storage capacitor Cst. Conventionally, the potential of the first node N1 changes over time due to a leakage current, leading to a continuous decrease in the brightness of the light-emitting element 11. In the embodiments of the present disclosure, $Bi1 \le Bi2 \le \ldots \le Bim$. That is, the durations of the second light-emitting periods c2 in the same data holding phase T2 successively increase to compensate for the impact of the leakage current on the brightness of the light-emitting element 11, so as to further alleviate the flicker problem in the first mode. In FIG. 6, for example, m=3, n=3, $B11 < B12 < B13$, $B21 < B22 < B23$, and $B31 < B32 < B33$. That is, the durations of the second light-emitting periods c2 in each data holding phase T2 satisfy the above relationship. The design can compensate for the change of the brightness caused by the leakage current in each data holding phase T2, thereby greatly improving the brightness consistency of the light-emitting element 11 within a working cycle T, alleviating or the avoiding the flicker problem.

Optionally, the driving method according to the embodiments of the present disclosure further includes: the durations are controlled to meet $B1j \le B2j \le \ldots \le Bnj$, j being any integer from 1 to m. That is, the duty cycles of the high-level pulses of the light emission control signal transmitted by the light emission control signal terminal E in different data holding phases T2 successively decrease to compensate for the impact of the leakage current on the brightness, so as to further alleviate the flicker problem in the first mode.

Exemplarily, when $n \ge 2$, the driving method according to the embodiments of the present disclosure further includes the following step.

The n data holding phases T2 at least include an (i−1)-th data holding phase T2 and an i-th data holding phase T2 that are adjacent. The duration of an m-th one of the second light-emitting periods c2 in the (i−1)-th data holding phase T2 is less than or equal to the duration of the first one of the second light-emitting periods c2 in the i-th data holding phase T2. That is, in the embodiment of the present disclosure, $B(i-1)m \leq Bi1$. $B(i-1)m$ denotes the duration of the m-th second light-emitting period c2 in the (i−1)-th data holding phase T2, and Bi1 denotes the duration of the first-one second light-emitting period c2 in the i-th data holding phase T2. Referring to FIG. 8, in FIG. 8, for example, m=3, n=3, and $B11<B12<B13<B21<B22<B23<B31<B32<B33$. The design can further alleviate the flicker problem in the first mode.

Exemplarily, as shown in FIGS. 3, 4, 5, 6, 7, and 8, when the working cycle of the pixel driver circuit 12 includes a plurality of data holding phases T2 and each data holding phase T2 includes a plurality of second light-emitting periods c2, in the embodiment of the present disclosure, the duration of any second light-emitting period c2 of each data holding phase T2 is greater than the duration B01 of the first-one first light-emitting period c1 in the data writing phase T1.

Exemplarily, as shown in FIGS. 12 and 13, the pixel driver circuit 12 further includes an adjustment switch 27 electrically connected to the second node N2. The data writing phase T1 further includes a data writing period b before the first light-emitting period c1. The data holding phase T2 further includes an adjustment period e before the second light-emitting period c2.

The driving method according to the embodiment of the present disclosure further includes the following step.

The adjustment switch 27 is controlled to provide a data signal Vd to the second node N2 in the data writing period b.

The adjustment switch 27 is controlled to provide a bias adjustment signal Vp to the second node N2 in the adjustment period e. The bias adjustment signal Vp can adjust the bias state of the driver transistor M0. The inventor found that in the data writing phase T1 at an initial stage of each working cycle T, due to a hysteresis voltage of the driver transistor M0, the light-emitting element 11 has a light emission delay, resulting in a brightness delay in the first-one first light-emitting period c1. In the embodiments of the present disclosure, the adjustment switch 27 adjusts the bias of the driver transistor M0 to generate a brightness delay when the display enters the second light-emitting period c2. The design can reduce the brightness of the light-emitting element 11 in the data holding phase T2, thereby reducing a brightness difference between the data holding phase T1 and the data writing phase T2, so as to alleviate the flicker problem in the first mode.

Moreover, in the embodiment of the present disclosure, the adjustment switch 27 is turned on in the data writing period b to provide the data signal Vd to the second node N2, and is turned on in the adjustment period e to provide the bias adjustment signal Vp to the second node N2. The design simplifies the structure of the pixel driver circuit 12, and reduces the area occupied by pixel driver circuit 12, thereby improving the resolution of the display panel.

Figure 14:
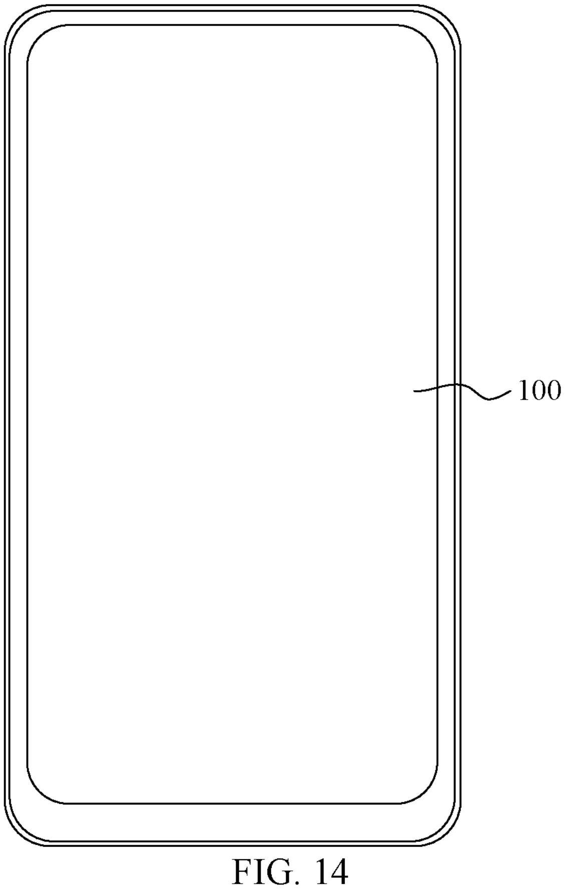
FIG. 14 is a schematic diagram of a display apparatus according to one or more embodiments of the present disclosure.

The embodiments of the present disclosure further provide a display apparatus. FIG. 14 is a schematic diagram of a display apparatus according to an embodiment of the present disclosure. As shown in FIG. 14, the display apparatus includes the foregoing display panel 100. A specific structure of the display panel 100 has been described in detail in the foregoing embodiments. Details are not described herein again. Certainly, the display apparatus shown in FIG. 14 is for schematic description only. The display apparatus may be any electronic device with a display function, such as a mobile phone, a tablet computer, a notebook computer, an ebook, or a television.

The above descriptions are merely preferred examples of the present disclosure, and are not intended to limit the present disclosure. Any modifications, equivalent replacements, improvements, and the like made within the spirit and principle of the present disclosure shall fall within the protection scope of the present disclosure.

What is claimed is:

1. A display panel, comprising: a light-emitting element, a pixel driver circuit electrically connected to the light-emitting element, and a control circuit, wherein the pixel driver circuit comprises a driver transistor and a first light emission control switch, the driver transistor comprises a gate electrically connected to a first node, a first electrode electrically connected to a second node, and a second electrode electrically connected to a third node, and the first light emission control switch is electrically connected between the third node and the light-emitting element, a working mode of the display panel comprises a first mode, in the first mode, a working cycle of the pixel driver circuit comprises a data writing phase and at least one data holding phase subsequent to the data writing phase, the data writing phase comprises at least one first light-emitting period, each data holding phase comprises at least one second light-emitting period, and the first light emission control switch is turned on in each first light-emitting period and each second light-emitting period, and the control circuit is configured to control a duration of a first one the at least one first light-emitting period in the data writing phase to be less than a duration of one of the at least one second light-emitting period, wherein the duration of the first one of the at least one first light-emitting period in the data writing phase is B01, the working cycle of the pixel driver circuit comprises n data hold phases, each of the n data holding phases comprises m second light-emitting periods, and a duration of a j-th second light-emitting period of the m second light-emitting periods in an i-th data holding phase of the n data holding phases is Bij, i and j being integers, where $1<i<n$, and $1<j<m$;

the display panel comprises a plurality of pixel driver circuit row groups and a plurality of cascaded light emission control sub-circuits, each pixel driver circuit row group comprises N pixel driver circuit rows, the pixel driver circuit rows each comprise a plurality of pixel driver circuits, and the first light emission control switches in a same one of the pixel driver circuit row groups are electrically connected to a same one of the light emission control sub-circuits, N being an integer greater than or equal to 1, and $B01=Bij-kNH$, k being an integer greater than or equal to 1, and H being a row scan time of a given pixel driver circuit row.

2. The display panel according to claim 1, wherein m=2, and kxN=4.

3. The display panel according to claim 1, wherein $Bi1 \leq Bi2 \leq \ldots \leq Bim$.

4. The display panel according to claim 1, wherein $B1j \leq B2j \leq \ldots \leq Bnj$.

5. The display panel according to claim 1, wherein n>2, the n data holding phases at least comprise an (i−1)-th data holding phase and the i-th data holding phase that are adjacent to one another, and a duration of an m-th second light-emitting period of the m second light-emitting periods in the (i−1)-th data holding phase is less than or equal to a duration of a first one of the m second light-emitting periods in the i-th data holding phase.

6. The display panel according to claim 1, wherein the data writing phase comprises m first light-emitting periods, m being an integer greater than or equal to 2, wherein the m first light-emitting periods at least comprise two adjacent first light-emitting periods, and a duration of a previous one of the two adjacent first light-emitting periods is less than a duration of a subsequent one of the two adjacent first light-emitting periods.

7. The display panel according to claim 1, wherein the pixel driver circuit further comprises an adjustment switch electrically connected to the second node, the data writing phase further comprises a data writing period prior to the at least one first light-emitting period, and the data holding phase further comprises an adjustment period prior to the at least one second light-emitting period, and the adjustment switch is configured to provide a data signal to the second node in the data writing period, and to provide a bias adjustment signal to the second node in the adjustment period.

8. The display panel according to claim 7, wherein the display panel further comprises a data line electrically connected to the adjustment switch; and the data line is configured to transmit the data signal in the data writing period, and to transmit the bias adjustment signal in the adjustment period.

9. The display panel according to claim 7, wherein the bias adjustment signal comprises a constant signal.

10. A method for driving a display panel, wherein the display panel comprises a light-emitting element and a pixel driver circuit electrically connected to the light-emitting element, the pixel driver circuit comprises a driver transistor and a first light emission control switch, the driver transistor comprises a gate electrically connected to a first node, a first electrode electrically connected to a second node, and a second electrode electrically connected to a third node, and the first light emission control switch is electrically connected between the third node and the light-emitting element, a working mode of the display panel comprises a first mode, in the first mode, a working cycle of the pixel driver circuit comprises a data writing phase and at least one data holding phase subsequent to the data writing phase, the data writing phase comprises at least one first light-emitting period, each data holding phase comprises at least one second light-emitting period, and the first light emission control switch is turned on in each first light-emitting period and each second light-emitting period, and the method comprises:

controlling a duration of a first one of the at least one first light-emitting period in the data writing phase to be less than a duration of one of the at least one second light-emitting period, wherein the duration of the first one of the at least one first light-emitting period in the data writing phase is B01, the working cycle of the pixel driver circuit comprises n data holding phases, each data holding phase comprises m second light-emitting periods, and a duration of a j-th second light-emitting period of the m second light-emitting periods in an i-th data holding phase of the n data holding phases is Bij, i and j being integers, where $1 \le i \le n$, and $1 \le j \le m$;

the display panel comprises a plurality of pixel driver circuit row groups and a plurality of cascaded light emission control sub-circuits, each pixel driver circuit row group comprises N pixel driver circuit rows, each pixel driver circuit row comprises a plurality of pixel driver circuits, and the first light emission control switches in a same one of the pixel driver circuit row groups are electrically connected to a same one of the light emission control sub-circuits, N being an integer greater than or equal to 1; and the controlling the duration of the first one of the at least one first light-emitting period in the data writing phase to be less than the duration of one of the at least one second light-emitting period comprises:

controlling B01=Bij−kNH, k being an integer greater than or equal to 1, and H being a row scan time of a given pixel driver circuit row.

11. The method according to claim 10, wherein $Bi1 \le Bi2 \le \ldots \le Bim$.

12. The method according to claim 10, wherein $B1j \le B2j \le \ldots \le Bnj$.

13. The method according to claim 10, wherein n>2, the n data holding phases at least comprise an (i−1)-th data holding phase and the i-th data holding phase that are adjacent to one another, wherein a duration of an m-th second light-emitting period of the m second light-emitting periods in the (i−1)-th data holding phase is less than or equal to a duration of a first second light-emitting period of the m second light-emitting periods in the i-th data holding phase.

14. The method according to claim 10, wherein the pixel driver circuit further comprises an adjustment switch electrically connected to the second node, the data writing phase further comprises a data writing period prior to the at least one first light-emitting period, and the data holding phase further comprises an adjustment period prior to the at least one second light-emitting period, and the method further comprises:

controlling the adjustment switch to provide a data signal to the second node in the data writing period; and controlling the adjustment switch to provide a bias adjustment signal to the second node in the adjustment period.

15. A display apparatus, comprising a display panel, wherein the display panel comprises: a light-emitting element, a pixel driver circuit electrically connected to the light-emitting element, and a control circuit, wherein the pixel driver circuit comprises a driver transistor and a first light emission control switch, the driver transistor comprises a gate electrically connected to a first node, a first electrode electrically connected to a second node, and a second electrode electrically connected to a third node, and the first light emission control switch is electrically connected between the third node and the light-emitting element, a working mode of the display panel comprises a first mode, in the first mode, a working cycle of the pixel driver circuit comprises a data writing phase and at least one data holding phase subsequent to the data writing phase, the data writing phase comprises at least one first light-emitting period, each data holding phase comprises at least one second light-emitting period, and the first light emission control switch is turned on in each first light-emitting period and each second light-emitting period, and the control circuit is configured to control a duration of a first one the at least one first light-emitting period in the data writing phase to be less than a duration of one of the at least one second light-emitting period, wherein the duration of the first one of the at least one first light-emitting period in the data writing phase is B01, the working cycle of the pixel driver circuit comprises n data hold phases, each of the n data holding phases comprises m second light-emitting periods, and a duration of a j-th second light-emitting period of the m second light-emitting periods in an i-th data holding phase of the n data holding phases is Bij, i and j being integers, where $1 \le i \le n$, and $1 \le j \le m$;

the display panel comprises a plurality of pixel driver circuit row groups and a plurality of cascaded light emission control sub-circuits, each pixel driver circuit row group comprises N pixel driver circuit rows, the pixel driver circuit rows each comprise a plurality of pixel driver circuits, and the first light emission control switchs in a same one of the pixel driver circuit row groups are electrically connected to a same one of the light emission control sub-circuits, N being an integer greater than or equal to 1, and $B01 = Bij - kNH$, k being an integer greater than or equal to 1, and H being a row scan time of a given pixel driver circuit row.

16. The display apparatus according to claim 15, wherein $Bi1 \le Bi2 \le \ldots \le Bim$.

17. The display apparatus according to claim 15, wherein $B1j \le B2j \le \ldots \le Bnj$.

* * * * *